(12) United States Patent
Denno

(10) Patent No.: US 7,016,437 B2
(45) Date of Patent: Mar. 21, 2006

(54) SIGNAL EXTRACTION METHOD AND APPARATUS IN WIRELESS COMMUNICATION SYSTEM

(75) Inventor: Satoshi Denno, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 873 days.

(21) Appl. No.: 09/951,740

(22) Filed: Sep. 14, 2001

(65) Prior Publication Data

US 2002/0044615 A1  Apr. 18, 2002

(30) Foreign Application Priority Data

Sep. 14, 2000 (JP) ............................. 2000-280709

(51) Int. Cl.
H03D 1/04 (2006.01)
(52) U.S. Cl. .................................... 375/346
(58) Field of Classification Search ................ 375/346, 375/347, 267
See application file for complete search history.

(56) References Cited

U.S. PATENT DOCUMENTS

| | | | |
|---|---|---|---|
| 3,763,490 A | | 10/1973 | Hadley et al. ........ 343/100 SH |
| 4,349,696 A | * | 9/1982 | Akitake et al. ........... 179/1 GS |
| 5,617,450 A | * | 4/1997 | Kakuishi et al. ............ 375/230 |

OTHER PUBLICATIONS

Satoshi Denno, "An Order Extended FTF (Fast Transversal Filter) Algorithm for Decision Feedback Adaptive Arrays", Vehicular Technology Conference, XP-010353258, Sep. 19, 1999, pp. 1875-1879.

Arvind V. Keerthi, et al., "A blind Adaptive Antenna System for the Estimation of Mutually Correlated Cochannel Sources", Military Communications Conference, 1995, XP-010154102, Nov. 5, 1995, pp. 1051-1055.

Dongning Guo, et al., "MMSE-Based Linear Parallel Interference Cancellation in Long-Code CDMA", Broadband Communications, 2000, XP-010376434, Feb. 15, 2000, pp. 31-38.

Satoshi Denno, "Multibeam Interference canceller Based on Order Extended Fast Algorithms", 11$^{th}$ International Conference on Antennas and Propagation, vol. 1, XP-009033463, Apr. 17, 2001, pp. 1-5.

Hak-Lim Ko, et al., "Smart Antenna for Multi-user Detector", IEEE Tencon, XP-010368243, Sep. 15, 1999, pp. 526-529.

* cited by examiner

Primary Examiner—Kenneth Vanderpuye
Assistant Examiner—Dung X. Nguyen
(74) Attorney, Agent, or Firm—Oblon, Spivak, McClelland, Maier & Neustadt, P.C.

(57) ABSTRACT

A signal extraction method is provided. In the method, signals are extracted by using K beam forming parts, wherein K is a natural number equal to or more than 2, and received signals from a plurality of antennas are applied to each beam forming part. The method includes the steps of: the received signals being processed by each beam forming part successively; a first beam forming part extracting a first signal from the received signals; and a kth beam forming part canceling, from the received signals, signal components which are extracted by beam forming parts from the first beam forming part to a (k−1)th beam forming part so as to extract a kth signal, wherein $2 \leq k \leq K$.

19 Claims, 13 Drawing Sheets

SIGNAL EXTRACTION METHOD AND APPARATUS IN WIRELESS COMMUNICATION SYSTEM

BACKGROUND OF THE INVENTION

1. Field of the Invention

The present invention relates to a signal extraction method and apparatus in a wireless communication system. More particularly, the present invention relates to a signal extraction method and apparatus used in an interference canceling apparatus and the like which cancels degradation due to co-channel interference in communication channels.

2. Description of the Related Art

In the wireless communication system, technologies are known in which interference from an adjacent channel or interference from other systems are canceled by using antennas.

For example, "other route interference canceling apparatus" for canceling interference by using two Cassegrain antennas is known as one of the technologies. The other route interference canceling apparatus is configured as shown in FIG. 1.

The other route interference canceling apparatus includes send apparatuses 2 and 4 sending a desired signal (D) and an interference signal (I) respectively, antennas 1 and 3 of the send apparatuses, two Cassegrain antennas 5 and 6 directed to a desired wave and an interference wave, an interference canceling apparatus 7, a variable phase shifter 8, a variable attenuator 9, a subtracter 10 and a demodulator 11.

In FIG. 1, the Cassegrain antennas are installed such that one of the two Cassegrain antennas is directed to the interference wave and another is directed to the desired wave. In this example, the Cassegrain antenna 6 is directed to the interference wave direction and the Cassegrain antenna 5 is directed to the desired wave direction. Since the Cassegrain antenna has strong directivity to the front direction, a signal having relatively high S/N ratio (signal-to-noise ratio) can be obtained from each Cassegrain antenna. Thus, an output signal of the Cassegrain antenna 5 and an output signal of the Cassegrain antenna 6 are input to the subtracter 10 after adjusting phase and amplitude of the output signal of the Cassegrain antenna 6. At this time, the interference canceling apparatus 7 adjusts the phase and the amplitude of the output signal of the Cassegrain antenna 6 such that it generates opposite phase signal with respect to interference wave which is included in the output signal of the Cassegrain antenna 5. Therefore, interference wave component is removed from the output signal of the Cassegrain antenna 5. That is, according to this other route interference canceling apparatus, interference is removed by subtracting interference wave component from the output signal of the antenna directed to the desired wave by using the output signal of the antenna directed to the interference wave.

However, according to the above-mentioned technology, two Cassegrain antennas are necessary for removing interference. Therefore, the size of the apparatus becomes large.

In addition, "Side lobe canceler" is proposed from the viewpoint of suppressing increase of the apparatus size. The side lobe canceler is configured as shown in FIG. 2, for example.

As shown in FIG. 2, the side lobe canceler includes feed elements 24–27 which form array antennas, a beam forming network (BFN) 28, a subtracter 29, a square circuit 30, an antenna output terminal 31, multipliers 32–35, an adder 36, and an adaptive controller 37.

In this side lobe canceler, the beam forming network 28 is designed such that a main beam is directed to the desired wave direction and a sub beam can capture the interference wave which is input from a different direction. In this side lobe canceler, weight coefficient of the sub beam is determined and controlled adaptively by the adaptive controller 37 such that energy of sum of the main beam and the sub beam becomes minimum at the square circuit 30. Accordingly, interference wave incident from the side lobe of the main beam can be suppressed equivalently.

The other route interference canceling apparatus and the side lobe canceler are effective for a system such as a fixed wireless communication system or a geostationary satellite communication system in which interference wave direction and desired wave direction hardly move. However, the other route interference canceling apparatus and the side lobe canceler can not be applied to a system such as a mobile wireless communication in which the desired wave direction and the interference wave direction change speedily.

In the mobile wireless communication, "adaptive array" is used as a technology for removing interference. According to this technology, a desired output signal can be obtained by synthesizing input signals from each (feed) element of the array antenna by assigning weights optimally.

The adaptive array can be configured as shown in FIG. 3, for example. This adaptive array includes feed elements 13–16 forming the array antenna, multipliers 17–20, an adder 21, an antenna output signal terminal 22 and an adaptive controller 23.

In the adaptive array, input signals from the feed elements 13–16 are weighted by weight coefficient vector output from the adaptive controller 23, and are synthesized by the adder 21 so that desired wave component is extracted. That is, even when an interference wave source or a desired wave source is moved, desired wave can always be extracted by estimating the weight coefficients adaptively in the adaptive controller 23.

MMSE (Minimum Mean Squared Error) is known as an algorithm for estimating the weight coefficients. According to an adaptive array based on MMSE, directivity is adaptively controlled such that null of about 40 dB is formed in the direction of the interference wave in addition that the beam is directed to the desired wave. As a result, interference can be canceled strongly since the desired wave and the interference wave can be separated.

In addition, "space area multistage interference canceler" is known as a technology for removing interference in which the adaptive arrays are connected forming multistages. This space area multistage interference canceler is configured as shown in FIG. 4 for example.

As shown in FIG. 4, the space area multistage interference canceler includes an input terminal 163 which receives signals from all elements of the array antenna, subtracters 221–226, interference extraction units 201–209, adaptive array units 201–209, adders 178–181, adaptive array antennas 182–184, phase synchronization circuits 185–186, complex multipliers 187–188, discriminators 189–191, and an output terminal 192.

The interference extraction units 201–209 include adaptive array antennas 182–184, discriminators 189–191, phase synchronization circuits 185–186 and complex multipliers 187–188. The interference extraction unit also is a replica generator.

In the space area multistage interference canceler, the interference extraction units 201–203 and the subtracters 221–223 form a first stage, and the adders 178–179, the interference extraction units 204–206 and the subtracters 224–226 form a second stage. As a third stage and thereafter, the same configuration as the second stage is connected in tandem.

In a pth interference extraction unit of the first stage in the space area multistage interference canceler, an output signal from the adaptive array antenna is discriminated by the discriminator. Then, convolutional operation is performed on the discriminated signal and impulse response of the transmission line (output from the phase synchronization circuit 185, 186) by the complex multiplier so that a replica signal $\hat{r}_{k,j,p}^{(1)}$ of the interference wave is generated, wherein r indicates the replica signal, (1) indicates the first stage, k indicates time, j indicates element number of antenna and p indicates the pth interference extraction unit.

The interference wave replica generated in this way is subtracted from the received signal from the array antenna element so that an error signal in which effect of the interference wave is eliminated is obtained at a point P. In the next second stage, interference extraction is performed in the same way as the first stage in which the error signal and the replica signal generated in the first stage are added in each corresponding interference extraction unit. Accordingly, as the stage proceeds, interference signal can be extracted under a condition that effect of interference is small. Thus, relatively good quality demodulation signal can be obtained.

However, as mentioned above, since the adaptive array antennas separate the desired wave and the interference wave by controlling directivity, interference can not be suppressed sufficiently when the desired wave and the interference wave enter the antenna from adjacent directions. In this case, the separation of the desired wave and the interference wave can be performed accurately by narrowing the beam of the array antenna by widening the interval of elements of the array antenna. However, when the interval of the elements is widened, interference wave increases so that diversity gain decreases.

In addition, when high-speed signal transmission is performed by using CDMA (Code Division Multiple Access), it can be estimated that delay waves of more than several number of symbols come from many directions so that interference waves increase. Thus, large number of elements are necessary to detect the interference waves for the above-mentioned adaptive array. As a result, the size of the apparatus and the amount of computation for removing the interference waves increase. Thus, power consumption can not be lowered.

On the other hand, although the space area multistage interference canceler serves for solving the above-mentioned problem of the adaptive array, the amount of computation increases in proportion to the product of the number of stages of the processing part which removes the interference wave and the number of interference waves which should be extracted. In addition, since the interference extraction unit includes complex circuits such as the adaptive array and the phase synchronization circuit, the apparatus cost increases. Further, as for the space area multistage interference canceler, like the adaptive array, when high-speed signal transmission is performed by using the access technology like CDMA, interference waves increase because delay spread and many multi-path waves intrinsic to the high-speed signal transmission occur. Thus, it is difficult to realize an apparatus which cancels thus increased interference waves by the space area multistage interference canceler.

SUMMARY OF THE INVENTION

A first object of the present invention is to provide a signal extraction method in which interference can be canceled independently of the interval of the elements of the antenna in a wireless communication system which transmits high-speed signals.

A second object of the present invention is to provide an apparatus which performs signal extraction by using the signal extraction method.

The above-mentioned first object can be achieved by a signal extraction method in which signals are extracted by using K beam forming parts, wherein K is a natural number equal to or more than 2, and received signals from a plurality of antennas are applied to each beam forming part, the signal extraction method comprising the steps of:

the received signals being processed by each beam forming part successively;

a first beam forming part extracting a first signal from the received signals; and a kth beam forming part canceling, from the received signals, signal components which are extracted by beam forming parts from the first beam forming part to a (k−1)th beam forming part so as to extract a kth signal, wherein $2 \leq k \leq K$.

According to the signal extraction method, since signal extraction is performed by canceling signal components which are extracted by beam forming parts up to a previous stage beam forming part from received signals which are received by a plurality of antennas. Therefore, signal extraction is performed in a state where interference component is suppressed.

In addition, since signal extraction is performed by using the received signals, signal extraction can be performed independently of antenna element interval.

From the viewpoint that high quality signal extraction is realized by using a plurality of signal extraction parts which are connected, the present invention can be configured as a signal extraction method in which signals are extracted by using signal extraction parts, wherein received signals from a plurality of antennas are applied to each signal extraction part, the signal extraction parts being connected, each signal extraction part including K beam forming parts, wherein K is a natural number equal to or more than 2, the signal extraction method comprising the steps of:

the received signals being processed by each beam forming part successively in a first signal extraction part;

a first beam forming part in the first signal extraction part extracting a first signal from the received signals;

a kth beam forming part in the first signal extraction part canceling, from the received signals, signal components which are extracted by beam forming parts from the first beam forming part to a (k−1)th beam forming part so as to extract a kth signal, wherein $2 \leq k \leq K$; and a kth beam forming part in a second signal extraction part or a later signal extraction part canceling, from the received signals, signal components extracted by beam forming parts in a previous stage signal extraction part other than a kth beam forming part in the previous stage signal extraction part so as to extract a kth signal.

According to the signal extraction method, a kth beam forming part in a signal extraction part of the second or later stage extracts a kth signal by canceling signal components which are extracted by beam forming parts of the previous stage other than a kth beam forming part of the previous stage from the received signals. Therefore, the later the stage where signal extraction is performed, the more interference component is removed from the kth signal. Therefore, a signal which has good SINR can be extracted.

From the viewpoint of controlling output order of signals extracted by each beam forming part by using SINR estimation result, the signal extraction method may further includes the steps of:

estimating an SINR value of a signal on the basis of the received signals; and changing order in which the beam forming parts perform signal extraction.

According to the signal extraction method, for example, signals extracted each beam forming part can be output in descending order of SINR. Therefore, high quality signal demodulation can be performed by using the signals be output in descending order of SINR.

The above-mentioned second object can be achieved by a signal extraction apparatus which extracts signals from received signals from a plurality of antennas, the signal extraction apparatus comprising:

K beam forming parts, wherein K is a natural number equal to or more than 2, and the received signals are applied to each beam forming part;

the received signals being processed by each beam forming part successively;

a first beam forming part extracting a first signal from the received signals; and a kth beam forming part canceling, from the received signals, signal components which are extracted by beam forming parts from the first beam forming part to a (k−1)th beam forming part so as to extract a kth signal, wherein $2 \leq k \leq K$.

A signal extraction apparatus of the present invention can be also configured as a signal extraction apparatus which extracts signals from received signals from a plurality of antennas, the signal extraction apparatus comprising:

signal extraction parts which are connected, each signal extraction part receiving the received signals;

each signal extraction part including K beam forming parts, wherein K is a natural number equal to or more than 2;

each beam forming part processing the received signals successively in a first signal extraction part;

a first beam forming part in the first signal extraction part extracting a first signal from the received signals;

a kth beam forming part in the first signal extraction part canceling, from the received signals, signal components which are extracted by beam forming parts from the first beam forming part to a (k−1)th beam forming part so as to extract a kth signal, wherein $2 \leq k \leq K$; and a kth beam forming part in a second signal extraction part or a later signal extraction part canceling, from the received signals, signal components extracted by beam forming parts in a previous stage signal extraction part other than a kth beam forming part in the previous stage signal extraction part so as to extract a kth signal.

The signal extraction apparatus may further includes:

an SINR estimation part which estimates an SINR value of a signal on the basis of the received signals; and wherein order in which the beam forming parts perform signal extraction is changed on the basis of the SINR value.

From the viewpoint of estimating SINR of each beam forming part, the signal estimation apparatus may includes:

K SINR estimation parts;

each SINR estimation part comprising beam forming parts, subtracters, square circuits and a minimum state estimation part;

a kth beam forming part in the beam forming parts receiving the received signals and signals extracted by beam forming parts up to (k−1)th beam forming part in which $0 \leq k-1 \leq K-1$, and outputting an extraction signal other than signals extracted by beam forming parts up to (k−1)th beam forming part;

the subtracter performing subtraction between a known signal and an the extraction signal so as to obtain a value, the known signal corresponding to a predetermined signal component other than signals extracted by beam forming parts up to the (k−1)th beam forming part;

the value being input into the square circuit so that an error is calculated;

the minimum state estimation part detecting a minimum value according to the error so that an SINR estimation result is output.

In addition, from the viewpoint of canceling signal components which have been extracted from received signals by controlling the beam forming part adaptively, in the signal extraction apparatus, the beam forming part may include an adder, an error detection part, first multipliers to which the received signals are applied, second multipliers to which signals extracted by beam forming parts up to (k−1)th beam forming part are applied, and an adaptive controller;

the adaptive controller receiving signals extracted by beam forming parts up to (k−1)th beam forming part and an error signal detected by the error detection part;

the adaptive controller estimating weight coefficients of the first and second multipliers so as to cancel, from the received signals, signal components extracted by beam forming parts up to (k−1)th beam forming part and extract only a predetermined signal; and wherein the weight coefficients are assigned to the received signals and signals extracted by beam forming parts up to (k−1)th beam forming part in the first and second multipliers, the signals to which the weight coefficients are assigned are applied to the adder, and an output signal of the adder is applied to the error detection part.

According to the signal extraction apparatus, the adaptive controller can estimate and update weight coefficients adaptively so as to cancel signal components which have been extracted from the received signals.

In addition, from the viewpoint of performing signal extraction, with reliability, in a transmission line having delay spread, in the signal estimation apparatus, the beam forming part may include feedforward filters and feedback filters with tap delay line, an adaptive controller and an adder;

each feedforward filter receiving a received signal from an antenna corresponding to the each feedforward filter, performing weighting and adding operation by using tap coefficient estimated by the adaptive controller adaptively, and the adder receiving outputs from the feedforward filters so as to extract a predetermined signal;

the predetermined signal being applied to the feedback filters; and each feedback filter performing weighting and adding operation by using tap coefficients estimated by the adaptive controller adaptively, and the adder receiving outputs from the feedback filters.

According to the signal extraction apparatus, since the adaptive control part controls tap coefficients of the feedforward filters and the feedback filters adaptively, effect of delay wave can be decreased when signal extraction is performed in a transmission line having delay spread.

In addition, from the viewpoint of performing signal extraction speedily, in the signal extraction apparatus, the adaptive controller may estimate the weight coefficients adaptively so as to cancel, from the received signals, signal components extracted by beam forming parts up to (k−1)th beam forming part; wherein a dimension extension type algorithm is used for estimation of the weight coefficients, one kind of gain vector is generated, and the gain vector is used for the estimation and update of the weight coefficients.

According to the signal extraction apparatus, since the dimension extension algorithm which allows high speed convergence is used for estimation and update of weight coefficients used for signal extraction, the estimation and update of weight coefficients is performed speedily. As a result, signal extraction can be performed more speedily.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described with reference to figures.

Figure 1:
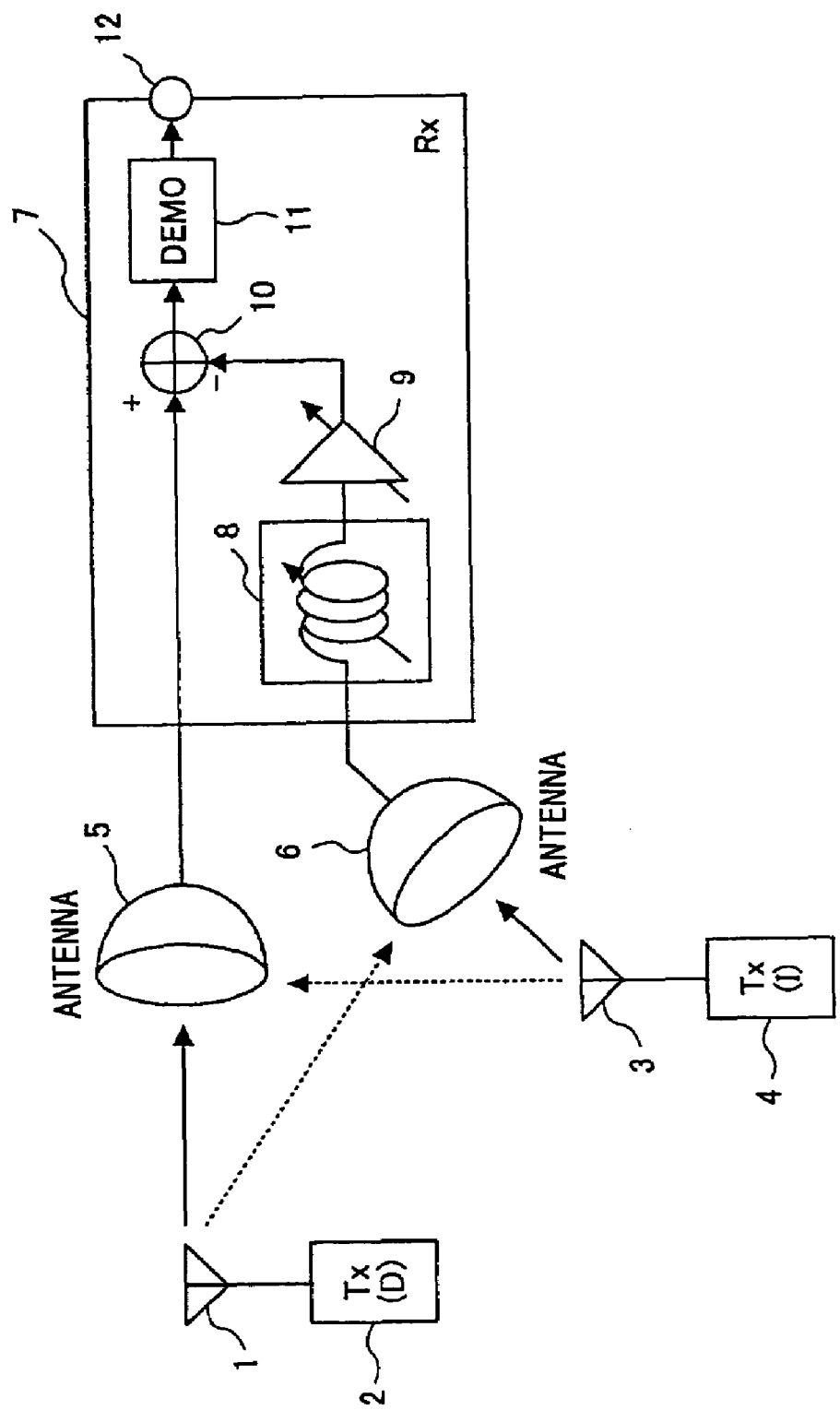
FIG. 1 shows a configuration of an other route interference canceling apparatus in which interference cancellation is performed according to a conventional interference cancellation method.
Figure 2:
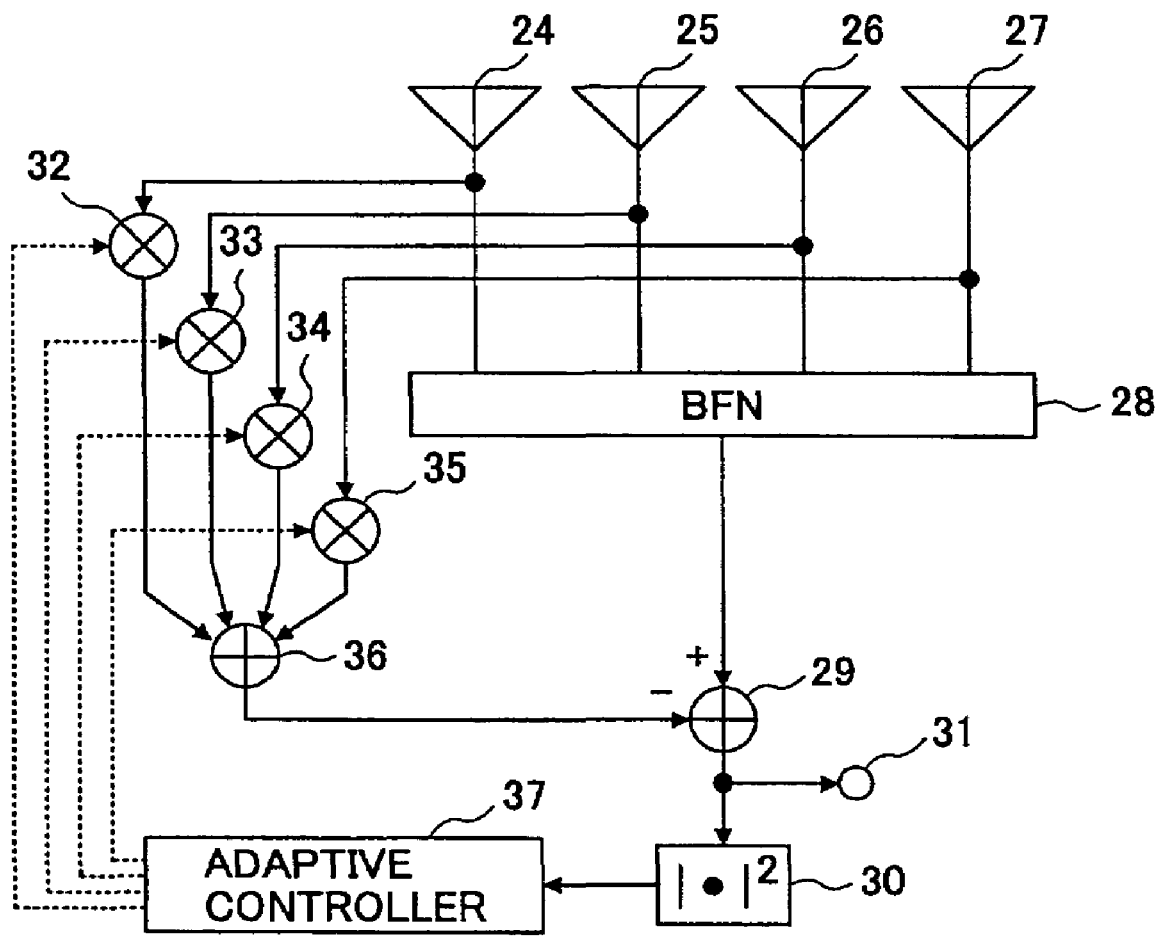
FIG. 2 shows a configuration of a side lobe canceler in which interference cancellation is performed according to a conventional interference cancellation method.
Figure 3:
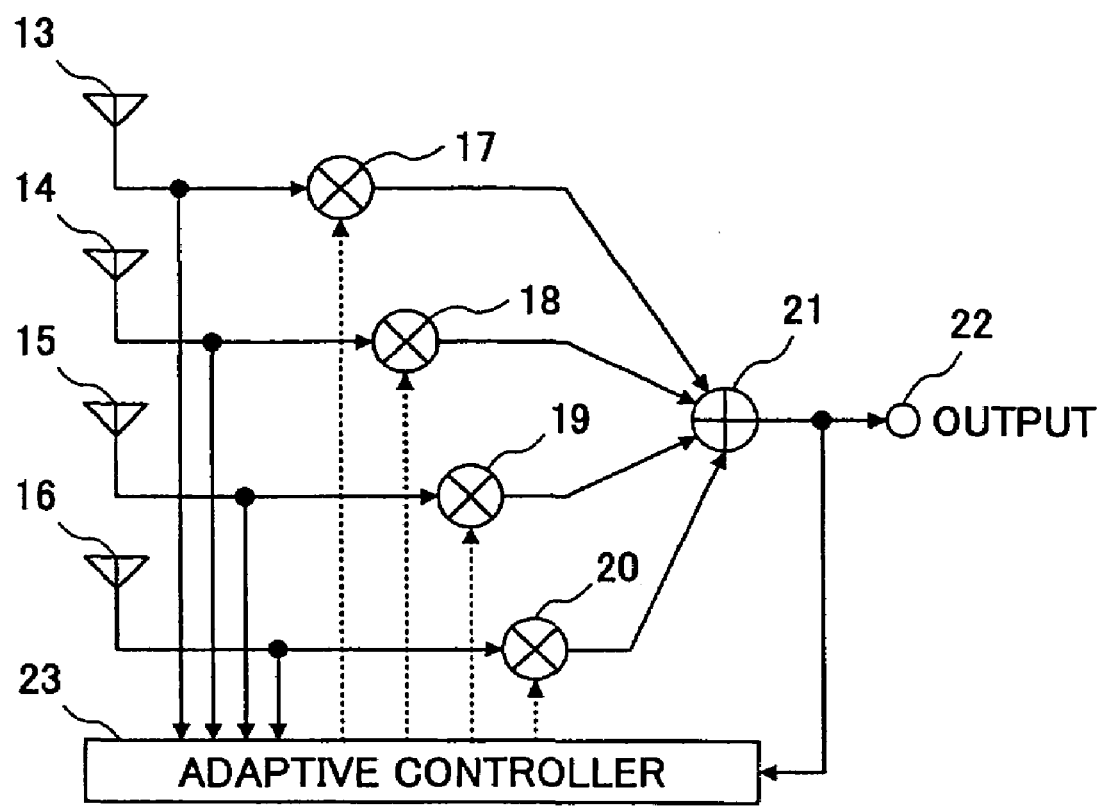
FIG. 3 shows a configuration of an adaptive array in which interference cancellation is performed according to a conventional interference cancellation method.
Figure 4:
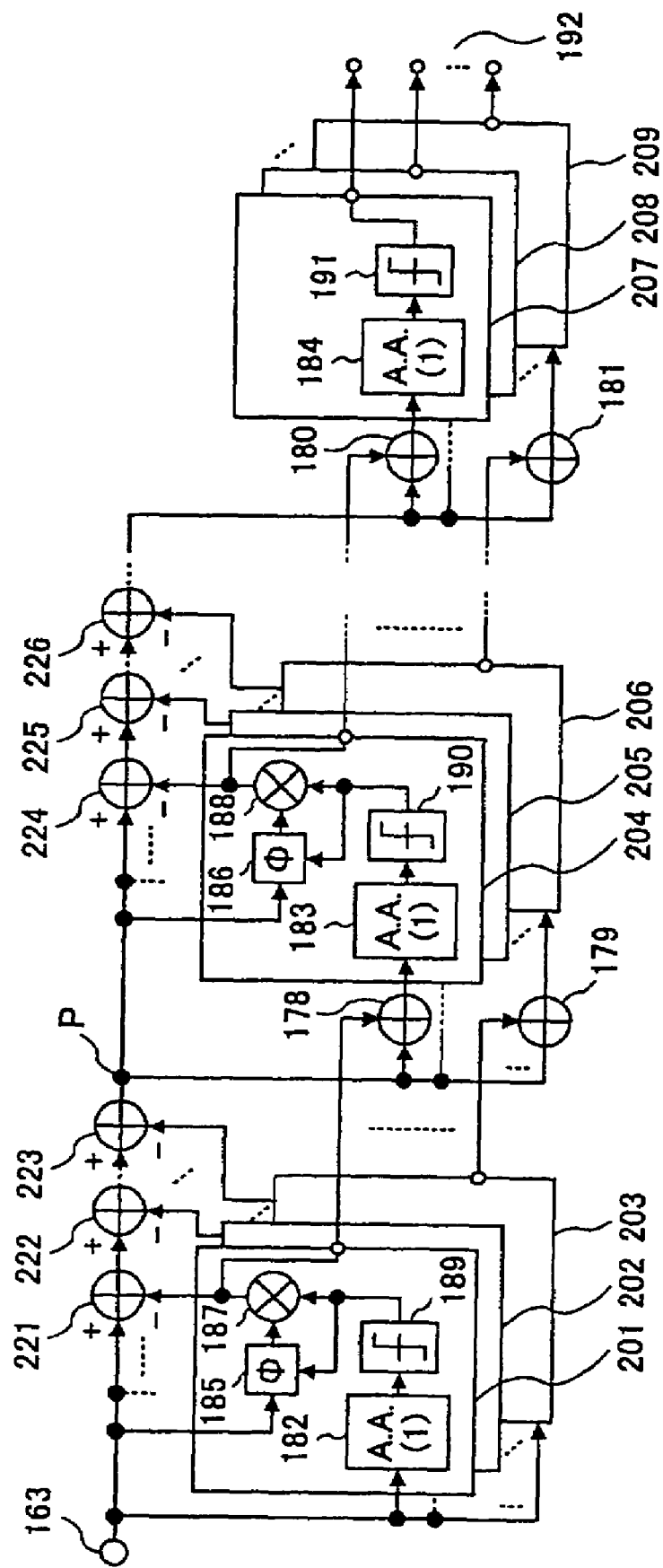
FIG. 4 shows a configuration of the space area multistage interference canceler in which interference cancellation is performed according to a conventional interference cancellation method.
Figure 5:
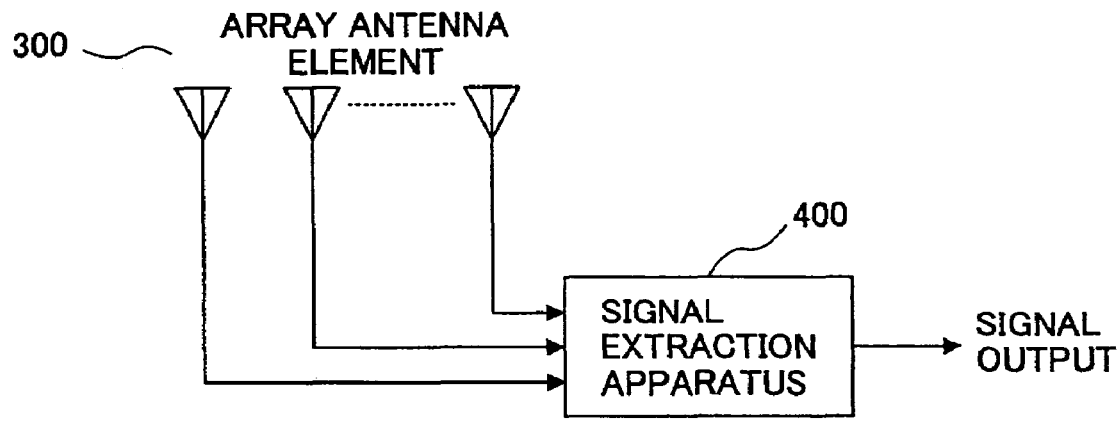
FIG. 5 shows a configuration of a wireless communication system to which a signal extraction method of an embodiment of the present invention is applied.

A system in which signal extraction is performed according to the signal extraction method of an embodiment of the present invention is configured as shown in FIG. 5 for example.

As shown in FIG. 5, the signal extraction apparatus 400 receives signals by an array antenna part 300. Then, the signal extraction apparatus 400 performs signal extraction for desired wave and interference wave on the basis of the received signals.

Figure 6:
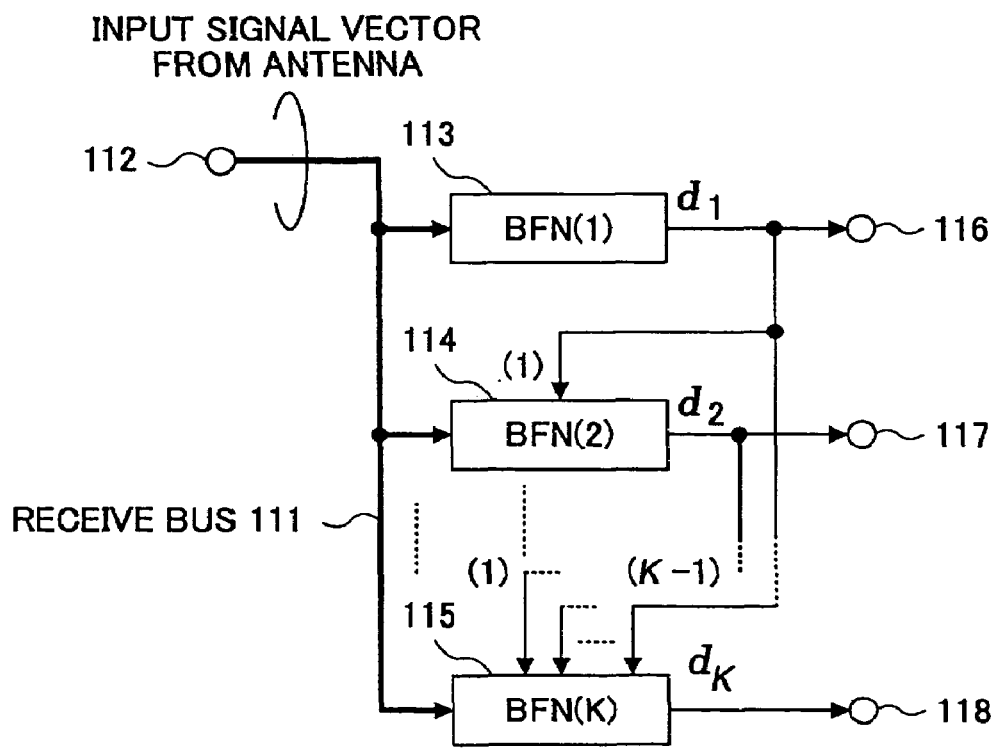
FIG. 6 shows a configuration of a signal extraction apparatus (first one) in the wireless communication system shown in FIG. 5.

The signal extraction apparatus 400 is configured as shown in FIG. 6 for example. FIG. 6 shows a first embodiment of the present invention.

In FIG. 6, the signal extraction apparatus 400 includes an input terminal 112 which receives signals from every element of the array antenna, beam forming networks (which will be called as BFN) 113–115 and antenna output terminals 116–118.

Figure 7:
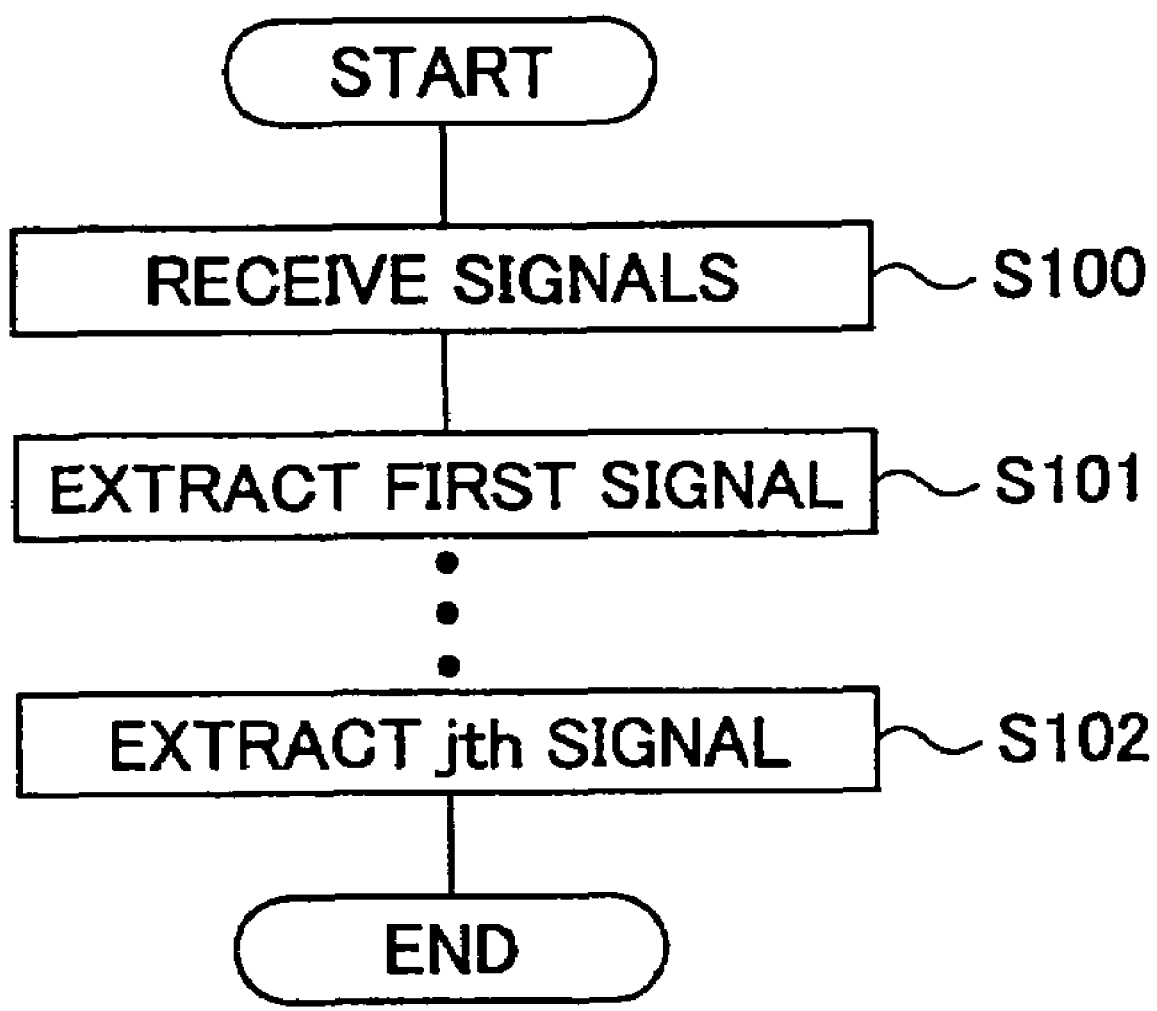
FIG. 7 is a flowchart showing an operation of the signal extraction apparatus.

In the following, the operation of the signal extraction apparatus 400 will be described with reference to FIG. 6 and a flowchart in FIG. 7.

In the signal extraction apparatus 400, first, received signals received by every element of the array antenna are input to each BFN 113–115 (step 100). When the first BFN(1) 113 receives the received signals, the first BFN(1) 113 assigns weights to the received signals and adds weighted received signals so that a signal $d_1$ is extracted, and outputs the signal $d_1$ to the second BFN(2) 114 (step 101).

In the second BFN(2) 114, the second BFN(2) 114 assigns weights to the signal $d_1$ and the received signals, and adds the weighted signals such that the signal $d_1$ is canceled. Then, the second BFN(2) 114 extracts a signal $d_2$ other than the signal extracted in the first BFN(1) 113. In this way, when extracting a jth signal, the extracted signals $d_1$–$d_{j-1}$ included in the received signals are canceled by using the extracted signals $d_1$–$d_{j-1}$ which are extracted by BNFs up to (j−1)th BNF, in other words, BFNs from the first BFN to the (j−1)th BNF (step 102). That is, as signal extraction is performed in more later stage, the signal extraction can be performed in a state in which interference condition is more relieved.

By performing such a canceling process one after another from the first stage BFN(1) to the last stage BFN(K) 115, ratio of interference in the received signals is further decreased. That is, in the last stage BFN(K) 115, since signal extraction is performed in a condition that interference is canceled by using input signals $d_1$–$d_{K-1}$ which have been extracted in antecedent BFNs, the signal $d_K$ can be extracted in a high SINR state (Signal to Interference and Noise Ratio) even when it is difficult to detect the received signal.

Figure 8:
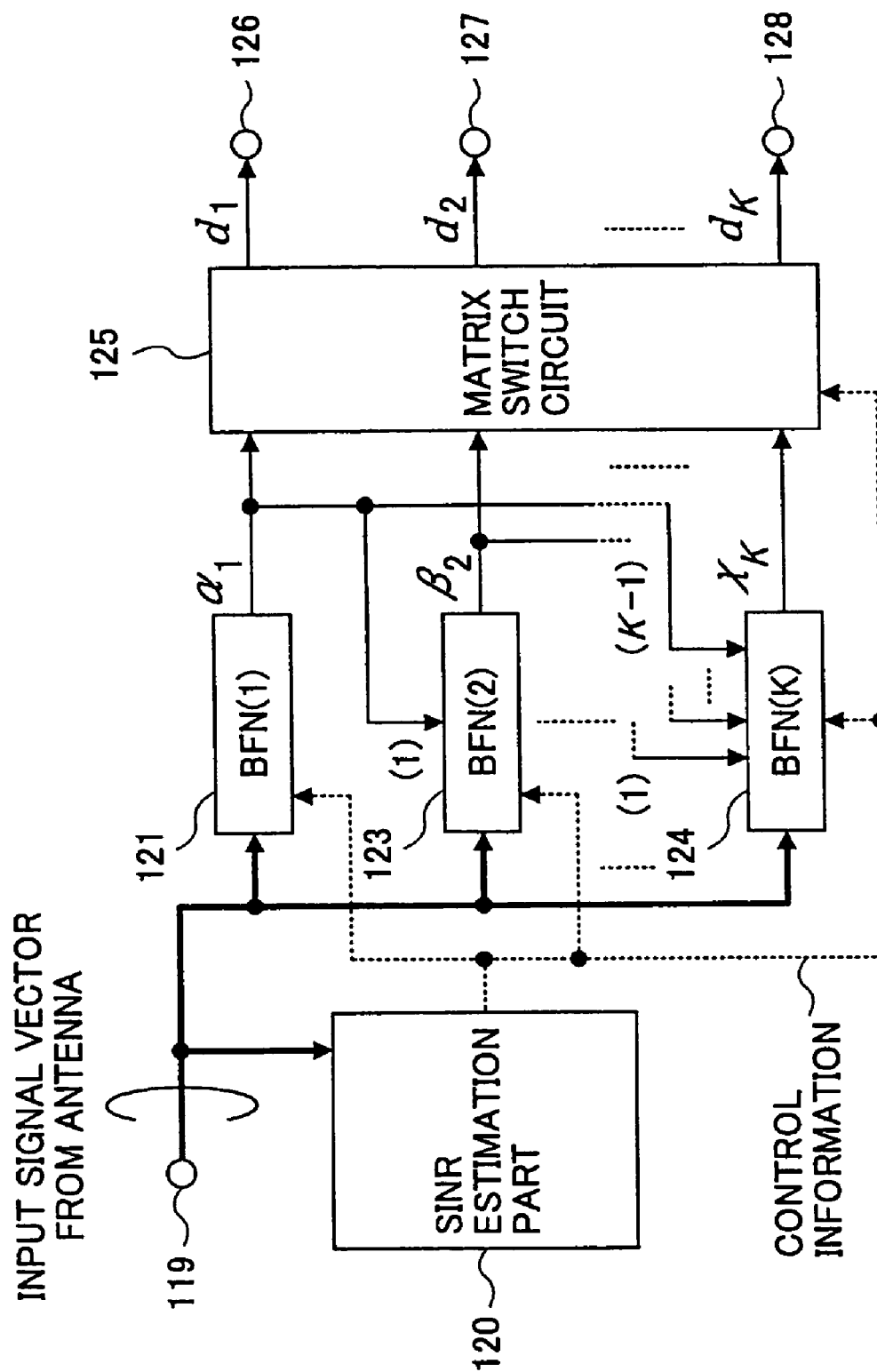
FIG. 8 shows a configuration of a signal extraction apparatus (second one) in the wireless communication system shown in FIG. 5.

The above-mentioned signal extraction apparatus 400 can be configured as shown in FIG. 8 as a second embodiment.

In FIG. 8, the signal extraction apparatus 400 includes an input terminal 119 which receives signals from all array antennas, an SINR estimation part 120 which estimates SINR of a signal output from each SINR, BFN(1) 121–BFN(K) 124, a matrix switch circuit 125, antenna output terminals 126–128.

Each of the BFN(1) 121–BFN(K) 124 synthesizes signals received by each array antenna weight assigning weight to each of the signals and add the weighted signals, so as to extract a signal $\alpha_1, \beta_1, \ldots, \chi_K$ which is the desired wave or the interference wave.

The SINR estimation part 120 estimates SINR of output of each BFN 121–124, judges from which BNF signal should be extracted first, and generates estimation information for sorting the BFNs in descending order of SINR. In addition, the SINR estimation part 120 outputs the estimation information to each BFN 121–124 and the matrix switch circuit 125.

The BFNs 121–124 are logically sorted in descending order of SINR on the basis of the estimation information output by the SINR estimation part 120, where broken lines in FIG. 8 indicate the estimation information. Then, the signals $\alpha_1, \beta_1, \ldots, \chi_K$ are extracted. The matrix switch 125 sorts the signals $\alpha_1, \beta_1, \ldots, \chi_K$ on the basis of the estimation information from the SINR estimation part 120 so as to output final signals $d_1, d_2, \ldots, d_K$ to terminals 126–128.

Since the signal extraction apparatus 400 extracts the signals $d_1, d_2, \ldots, d_K$ which have high SINR sequentially on the basis of estimation information from the SINR estimation part 120, signals having higher quality can be demodulated as a whole.

Figure 9:
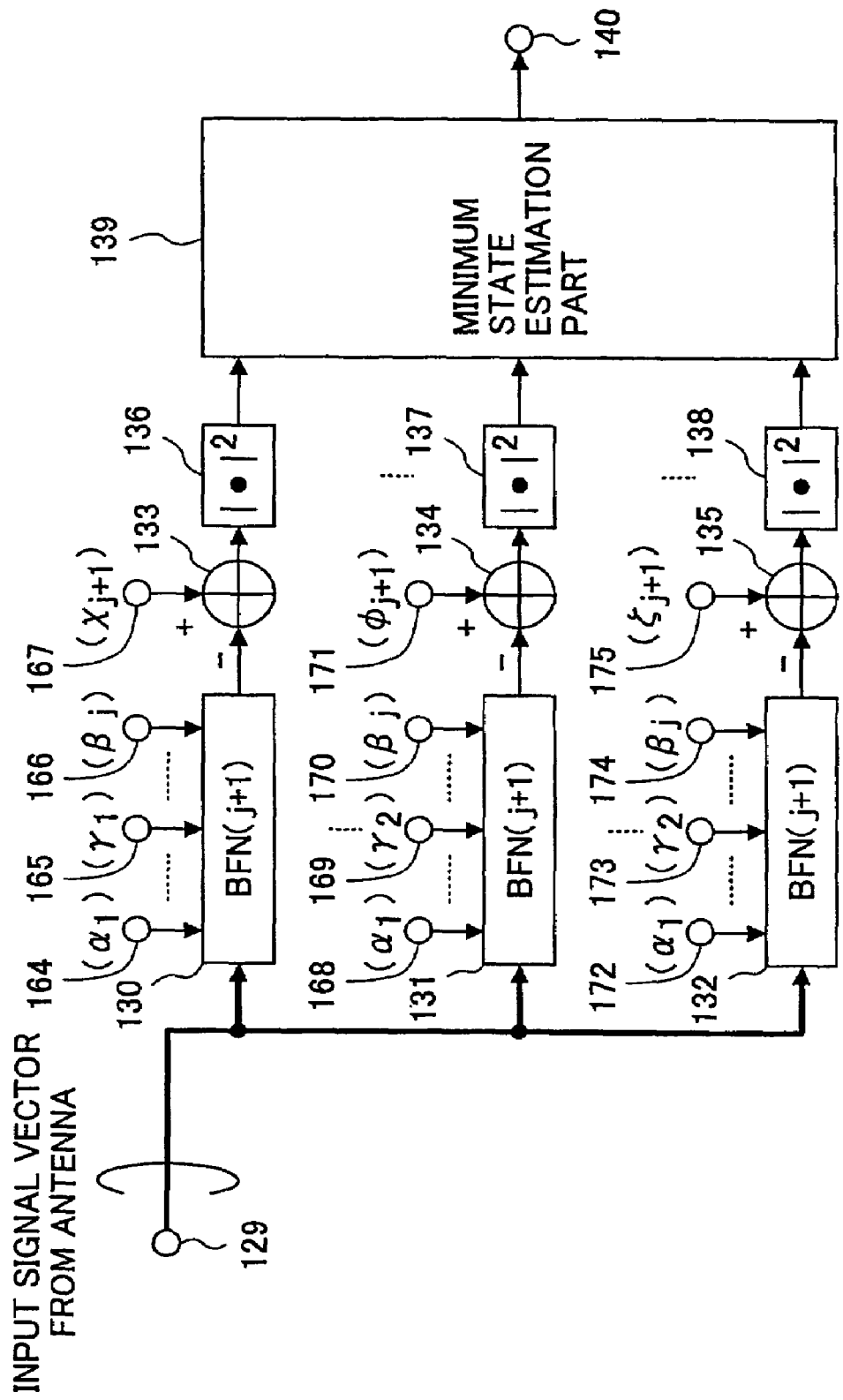
FIG. 9 shows a configuration of an SINR estimation part in the signal extraction apparatus (second one) shown in FIG. 8.

The SINR estimation part 120 can be configured as shown in FIG. 9 for example. In FIG. 9, the SINR(j+1) estimation part includes an input terminal 129 for receiving signals from all antenna elements, BFNs 130–132, terminals 164–166, 168–170, 172–174 for receiving signal sequence extracted by BFNs up to jth BFN, terminals 167, 171 and 175 for receiving candidate signal to be extracted by (j+1)th BFN, subtracters 133–135, square circuits 136–138, a minimum state estimation part 139 for detecting a state of a BFN which outputs a minimum value, and an output terminal 140 of the minimum state estimation part. The SINR(j+1) estimation part corresponds to the BFN which extracts the (j+1)th signal.

Interference wave or desired wave which is extracted by signals up to jth signal is determined by a previous stage SINR(j). Thus, signals extracted up to jth are input to the input terminals 164–166, 168–170 and 172–174. In addition, the received signals are input to each BFN 130–132 simultaneously.

Next, in each BFN 130–132, weights are assigned to signals up to the jth and the weighted signals are added so that added output signal is obtained. In the SINR(j+1) estimation part, subtraction is performed between the added output signal and the candidate signal in each subtracter 133–135, the candidate signal being a known training signal 167, 171, 175 for example. Then, Euclidean error is estimated by performing square operation on the subtraction result in the square circuit. Thus obtained estimation values of Euclidean error are input to the minimum state estimation part 139 so that minimum value of the Euclidean error for candidate values is detected. In the minimum state estimation part 139, a candidate signal by which the minimum value of the Euclidean error is obtained is regarded as the (j+1)th signal, and is output. At this time, estimation of weight coefficients used for weighing and adding is performed for each candidate signal independently. Therefore, for each candidate signal, the weight coefficients are estimated such that SINR becomes maximum when the candidate signal is extracted. As a result, candidate sequence and weight coefficients in which SINR is the best among candidates are determined.

In the SINR estimation part, the order in which the interference wave and the desired wave are extracted is determined by cascading SINRs and sending estimation result information of an SINR to a next SINR estimation part (for example, j+1) one after another.

Figure 10:
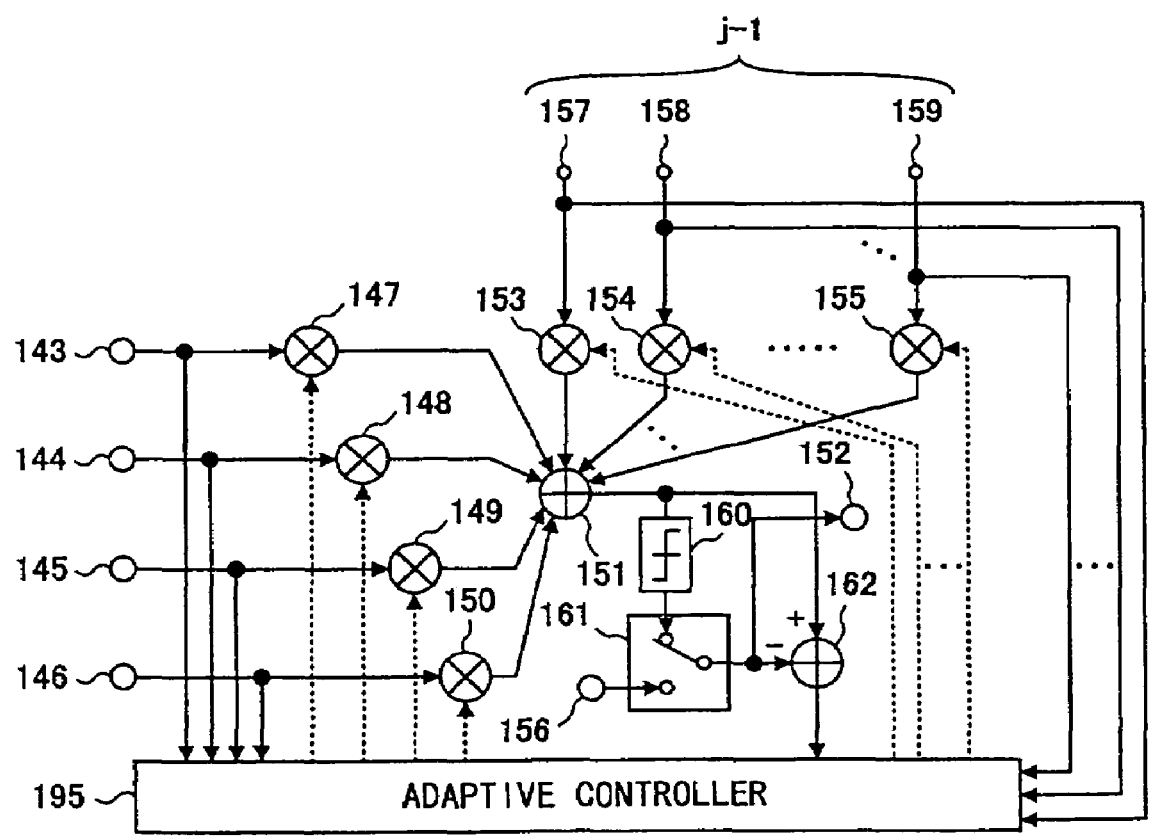
FIG. 10 shows a configuration of a BFN (first one) in the signal extraction apparatus in the wireless communication system shown in FIG. 5.

Each of the BFN(1) 121–BFN(K) 124 can be configured as shown in FIG. 10 for example. Since the configuration for the BFN(1) 121–BFN(K) 124 is the same each other, a jth BFN which is indicated by BFN(j) will be described.

As shown in FIG. 10, the BFN(j) includes input terminals 143–146 for receiving signals from all elements of the array antenna, multipliers 147–150, 153–155, output terminals 157–159 of the BFN(1)–BFN(j-1), an adder 151, an output terminal 152, a discriminator 160, a switch 161, a training signal input terminal 156, a subtracter (error detection part) 162 and an adaptive controller 195. When the BFN(j) receives signals 143–146 from all elements of the array antenna, the BFN(j) weights the signals by using weight coefficients determined in the adaptive controller 195. At the same time, signals extracted from BFN(1)–BFN(j-1) are weighted by using the weight coefficients and added so that the discriminator receives the added output signals.

When the added output signals are input to the discriminator 160, the signals are discriminated and the result is output to the switch 161. By the discriminator, when the received signals from the antenna are in training interval which is inserted into a header of a packet and the like, a training signal is input from the training signal input terminal 156 into the subtracter 162 by the switch 161.

When the discriminator 160 detects that receive data is in training interval, the switch 161 outputs the training signal. On the other hand, when the discriminator 160 detects that receive data is in information data interval, the switch 161 outputs the signal which is discriminated by the discriminator 160 to the subtracter 162. The subtracter 162 obtains difference between the output signal of the switch 161 and the added output signal, and generates error signal and inputs the error signal to the adaptive controller 195. For extracting jth signal $d_j$, the adaptive controller 195 performs adaptive control for weight coefficients such that signals extracted by BFNs up to (j-1)th BFN are canceled from the received signals on the basis of the received signals from the array antenna, the error signal and the input signals to the BFN(j). For estimating the weight coefficients, a high speed algorithm which allows high speed convergence is used, for example, a dimension extension algorithm is used.

According to this dimension extension algorithm, since solution of least square is obtained sequentially in the same way as the RLS (Recursive Least Squares) adaptive algorithm, the dimension extension algorithm converges as speedily as the RLS algorithm.

In addition, according to the dimension extension algorithm, a gain vector necessary for high speed convergence can be obtained with small amount of computation since digital filters perform vector operation while shifting signals in registers sequentially.

For example, the amount of computation increases in proportion to square of the length of register for gaining the gain vector when using an adaptive algorithm such as RLS. On the other hand, by using the dimension extension algorithm, the gain vector can be calculated in proportion to the length of register.

Thus obtained gain vector is used for updating the weight coefficient vector. For example, when BFN(j-1) extracts signal $d_{j-1}$, the gain vector of weight coefficients is updated such that the signal $d_{j-1}$ is canceled in BFN(j-1). By performing such process repeatedly in BFN(2)–BFN(K), weight coefficient vectors up to BFN(K-1) are updated.

When update of the weight coefficient vectors up to BFN(K-1) is completed, a signal $d_K$ is extracted and output from the output terminal 118 by inputting the signals $d^1$–$d_{K-1}$ extracted by BFNs up to BFN(K–1). As a result, update of the gain vector at the time k is completed.

Accordingly, although different weight coefficients are necessary for each of signals $d_1$–$d_{K-1}$, every gain vector can be obtained by performing dimension extension process of one system gain vector. Therefore, the weight coefficients can be estimated with low amount of computation and speedily. As a result, signal extraction can be performed speedily in each BFN.

The estimation of the weight coefficients can be performed by an equation (1) for example.

$$W_{opt,k}=E[X_{k,j}X_{k,j}{}^H]^{-1}E[d^*_{k,j}X_{k,j}] \quad (1)$$

In the equation (1), $X_{k,j}$ indicates a signal input to the adaptive controller 195, that is, an input vector.

The input vector $X_{k,j}$ in the equation (1) is provided by an equation (2).

$$X_{k,j}=[r_{k,1}\ldots,r_{k,N},d_{k,1}\ldots,d_{k,j-1}]^T \quad (2)$$

In the equation (2), $r_{k,j}$ indicates an input signal from an ith element of the array antenna, $d_{k,q}$ indicates a signal extracted by BFN(q) (q=1, . . . , j–1). In addition, in the equation (1), numerical subscript H represents Hermite transpose, * indicates complex conjugate, E[•] indicates set mean, and $(•)^{-1}$ indicates inverse matrix. Optimum weight coefficients can be obtained by replacing the set mean of the equation (1) with time mean by using ergodic theorem. That is, the coefficients are obtained by performing time mean process and inverse matrix operation. As for the inverse matrix operation, for example, in array antennas to which L signals are received simultaneously, L×L inverse matrix operation is required in which the amount of computation increases in proportion to the cube of the dimension.

Estimation operation of the weight coefficients of the equation (1) is performed according to a high speed algorithm by which the estimation can be performed with small amount of computation, for example, dimension extension type Kalman algorithm which uses the dimension extension high speed algorithm.

In the dimension extension type Kalman algorithm, the optimized weight coefficient $W_{k,j}$ is calculated according to following equations (3)–(13).

$$\phi_{N+j}(k)=A_{N+j}{}^H(k-1)X_{N+j}(k) \quad (3)$$

$$A_{N+j}(k) = A_{N+j}(k-1) - \begin{bmatrix} 0 \\ K_{N+j-1}(k-1) \end{bmatrix} \phi^*_{N+j}(k) \quad (4)$$

$$e_{N+j}(k)=A_{N+j}{}^H(k)X_{N+j}(k) \quad (5)$$

$$F_{N+j}(k)=\lambda F_{N+j}(k-1)+\phi_{N+j}(k)e^*_{N+j}(k) \quad (6)$$

$$K_{N+j}(k) = \begin{bmatrix} 0 \\ K_{N+j-1}(k-1) \end{bmatrix} + \frac{e_{N+j}(k)}{F_{N+j}(k)} A_{N+j}(k) \quad (7)$$

$$\begin{bmatrix} T_{N+j-1}(k) \\ \tau(k) \end{bmatrix} = K_{N+j}(k) \quad (8)$$

$$b_{N+j}(k)=C_{N+j}{}^H(k-1)X_{N+j}(k) \quad (9)$$

$$C_{N+j}(k) = (1 - b^*_{N+j}(k)\tau)^{-1}\left(C_{N+j}(k-1) - b^*_{N+j}(k)\begin{bmatrix} T_{N+j-1}(k) \\ 0 \end{bmatrix}\right) \quad (10)$$

$$\begin{bmatrix} K_{N+j-1}(k) \\ 0 \end{bmatrix} = K_{N+j}(k) - \tau C_{N+j}(k) \quad (11)$$

$$\epsilon_j(k)=d_{k,j}-W_{k-1,j}{}^H X_{k,j} \quad (12)$$

$$W_{k,j}=W_{k-1,j}+K_{N+j-1}(k)\epsilon^*(k) \quad (13)$$

In the equations (3)~(13), the input vector $X_{N+j}(k)$ is represented by $$X_{N+j}(k)=[r_{k,1},\ldots,r_{k,N},d_{k,1},\ldots,d_{k,j-1},d_{k,j}]^T$$

Accordingly, by calculating the vector updating equations (3)~(13) in each BFN(j), the weight coefficient $W_{k,j}$ is obtained.

In this case, it is obtained as N+j dimension vector as indicated by the following equations.

$$A_{N+j}(k)=[1,a_{k,1}\ldots a_{k,N+j-1}]^T, C_{N+j}(k)=[c_{k,1}\ldots c_{k,N+j-1},1]^T$$

Each of the equations (3)~(13) is formed by a vector or a scalar in which a subscript indicates the dimension. "k" as the subscript or which is parenthesized indicates time, and "λ" indicates forgetting coefficient which is incorporated in order to follow variation of a transmission line.

In addition, the equation (12)

$$\epsilon_j(k)=d_{k,j}-W_{k-1,j}{}^H X_{k,j}$$

indicates an error signal from the signal $d_{k,j}$ which is extracted by jth BFN(j). Therefore, the optimized weight coefficient $W_{k,j}$ of the equation (13) can be obtained as the sum of jth weight coefficient $W_{k-1,j}$ at a time of k–1, the gain vector $K_{N+j-1}(k)$ and complex conjugate $\epsilon^*(k)$ of the error signal obtained by the equation (12). The gain vector $K_{N+j-1}(k)$ indicates direction and size of the signal.

In addition, a dimension extension type FTF (Fast Transversal Filter) algorithm can be used as the high speed algorithm which uses the dimension extension high speed algorithm. Feedforward filters and feedback filters are provided in a BFN in which signal extraction is performed according to the FTF algorithm. In such a BFN, delay wave component can be removed from received signals of the antenna by the filters, signal extraction can be performed while performing delay cancellation for high speed transmission.

Figure 11:
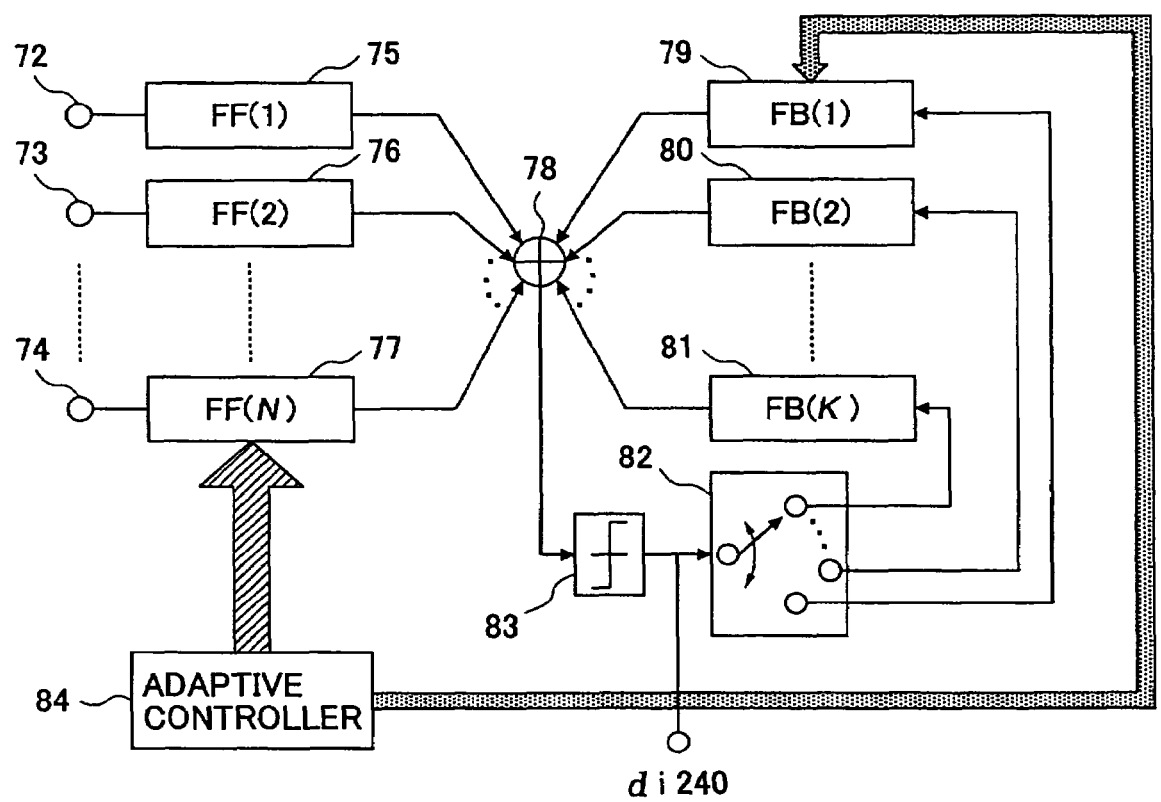
FIG. 11 shows a configuration of a BFN (second one) in the signal extraction apparatus in the wireless communication system shown in FIG. 5.

The BFN using the FTF algorithm is configured as shown in FIG. 11 for example.

As shown in FIG. 11, the BFN includes input terminals 72~74 receiving signals from all elements of the array antenna, delay line filters with taps 75~77 and 79~81, an adder 78, a discriminator 83, a switch 82 and an adaptive controller 84. The delay line filters with taps 75~77 indicate feedforward filters, and delay line filters with taps 79~81 indicate feedback filters. The adaptive controller 84 controls tap coefficients of the delay line filters with taps.

In this BFN, the received signals from the array antenna are synthesized via feedforward filters 75~77. The synthesized signal passes through the discriminator 83. After that, discrimination signal $d_i$ is output from the output terminal 240. At the same time, the discrimination signal $d_1$ is supplied to the discriminator 83 via the feedback filters 79~81.

In the feedback filter 79~81, the discrimination signal $d_i$ is input to a register and is shifted. In addition, the discrimination signal is input to the feedback filters 79~81 while the discrimination signal being switched by the switch 82. The discrimination signal also can be input to the feedback filters serially.

The estimation of the weight coefficients in the BFN is performed according to the dimension extension type FTF algorithm. In the dimension extension type FTF algorithm, the input vector is defined by the following equation (14).

$$X_{L+1,j}(k) = [r_{k+Lf,1}, \ldots, r_{k+Lf-1,N}, d_{k,j}, d_{k,j-1}, \ldots, d_{k-1}, \\ \kappa, \ldots, d_{k-Lb-1,j+1}]^T \quad (14)$$

In the equation (14), Lf indicates feedforward tap length of each antenna element, Lb indicates feedback tap length of an output signal to be extracted. L indicates whole tap length which is indicated by L=NLf+KNb.

According to the dimension extension type FTF algorithm, optimized weight coefficient can be obtained in the same way as the dimension extension type high speed Kalman algorithm by modifying the input vector of the equation (14) into the equations (3)~(13).

The feedback tap length Lb relates to a delay time to be canceled. For example, in a communication system in which transmission speed is high, the higher the transmission speed is, the longer the feedback tap length Lb is to be set.

As a result, in the BFN using the dimension extension type FTF algorithm, in addition that the computation of the optimized weight coefficient is performed speedily, delay wave can be suppressed by setting the feedback tap length and feedforward tap length properly according to the delay wave state even when delay spread of the transmission line is large.

Figure 12:
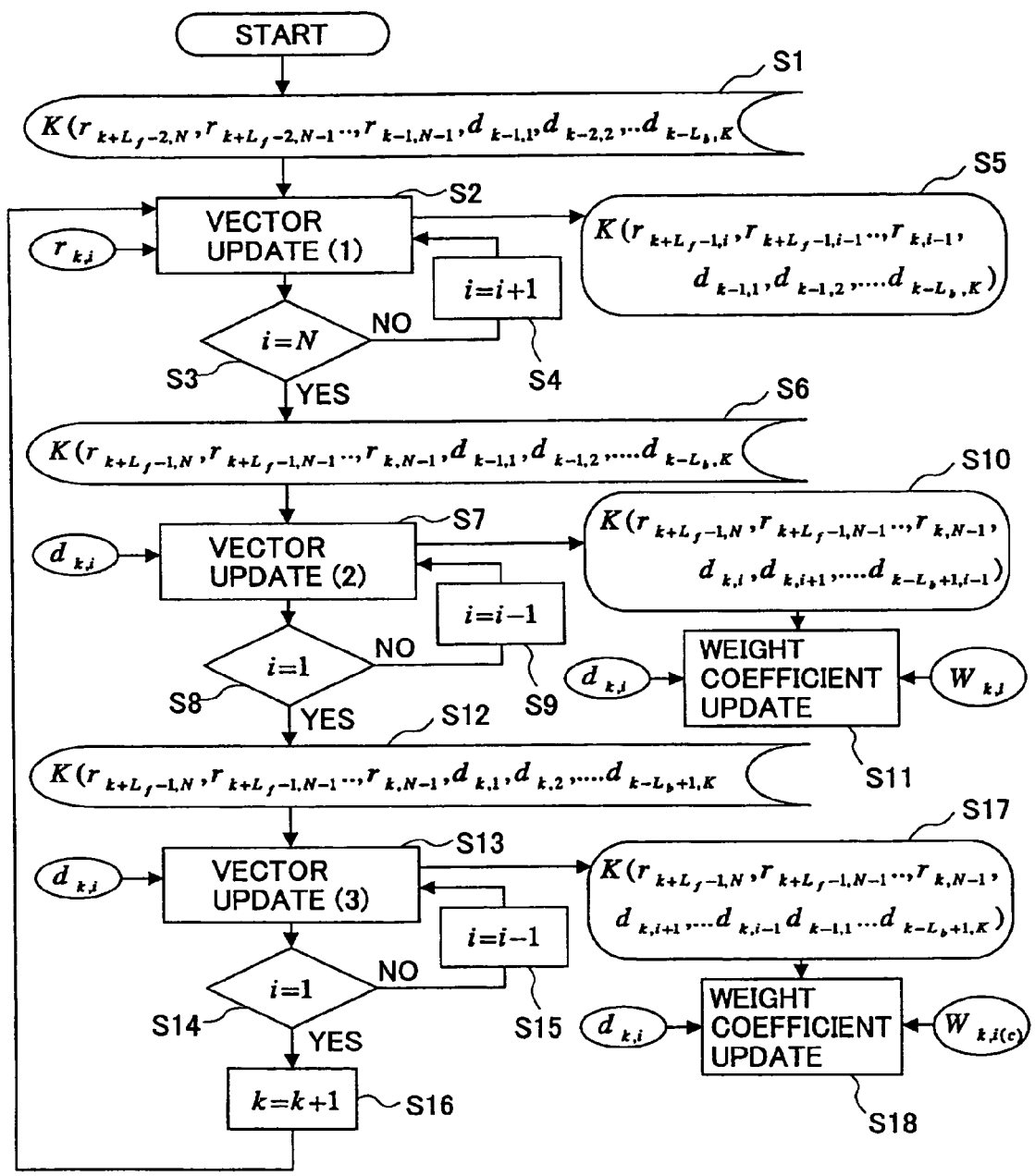
FIG. 12 is a flowchart showing an example of a process for generating a gain vector used for weight coefficient estimation operation in the signal extraction apparatus in the wireless communication system shown in FIG. 1.

Update of the gain vector necessary for high speed estimation of the optimized weight coefficients is performed according to a process shown in FIG. 12, for example, in the adaptive controller 84 in the BFN.

In the flow chart shown in FIG. 12, the inside of the parentheses {K( . . . )} of the gain vector K indicates values of the register for representing relationship between the gain vector K and the corresponding register sequence.

The adaptive controller 84 updates the gain vector estimated up to the time k−1 by using received signals $r_{k,j}$ received from the antenna elements. That is, update operation of the gain vector (S2) is performed by using signals received by the time k−1 which are stored in the gain vector (S1), all signals extracted from a plurality of signals and a signal $r_{k,j}$ received by the ith array antenna element. Any one of the dimension extension type high speed Kalman algorithm and the dimension extension type FTF algorithm can be used as the high speed algorithm used for the update operation for the gain vector.

When the update operation is performed for the ith array antenna element, the result is held in a predetermined area A (S5), and it is judged whether the update operation of the gain vector has been performed for received signals of all elements N of the array antenna (S3). At this time, when the result of the judgment is NO, i is incremented by +1 (S4) so that update operation of the gain vector is performed by using received signal of (i+1)th array antenna element. When it is judged that the update operation of the gain vector is completed for the received signals of all elements N of the array antenna (YES in S3), the process proceeds to the next step. Then, after the gain vector is updated, the output is stored in the memory (S6).

The process of (S2)~(S5) is performed repeatedly until the process is performed for all elements of the antenna. At this time, received signals before the time k and signals before the time k−1 are stored in the register of the gain vector (S6).

Then, the first signal $d_{k,1}^{(0)}$ is extracted by using the gain vector (S6) on the basis of the estimation result in the SINR estimation part. "k" in $d_{k,1}^{(0)}$ indicates time, "1" indicates signal number and "(0)" indicates stage number of BFN. At this time, the values in the register of the gain vector (S6) corresponds to the first signal $d_{k,1}^{(0)}$.

Accordingly, when the first signal $d_{k,1}^{(0)}$ is thus extracted, the gain vector is updated by using a signal extracted by using the first signal $d_{k,1}^{(0)}$. In addition, when the gain vector is updated, the weight coefficient can be calculated (S11) by using the updated gain vector (S10).

By performing the above-mentioned process, the second signal $d_{k,2}^{(0)}$ can be generated, a signal can be extracted, and the weight coefficient can be updated.

The gain vector is updated every time when the signal is extracted one by one like third signal, fourth signal, . . . , Kth signal. In addition, update operation of the weight coefficient estimation is performed (S7)~(S11) repeatedly on the basis of the gain vector so that the weight coefficient estimation (S11) of a first stage is completed.

When the signal extraction process of time k is completed as mentioned above, the time counter k is incremented by +1 (S16) and the signal extraction process is performed repeatedly.

Next, $d_{k,K}$ is input into the register by lengthening the register of the gain vector by one. In addition, $d_{k,K}^{(0)}$ is input into the register and the dimension of the gain vector is extended by one. Then, only a signal which is desired to be extracted is output from the register, and the element corresponding to the register is excluded from the gain vector and the dimension of the gain vector is reduced by one. That is, by performing the dimension extension process, the gain vector and the register of a plurality of signals after the second stage are generated.

Therefore, by using the above-mentioned gain vector, the weight coefficients for a plurality of signals after the second stage can be updated by using the gain vector.

Figure 13:
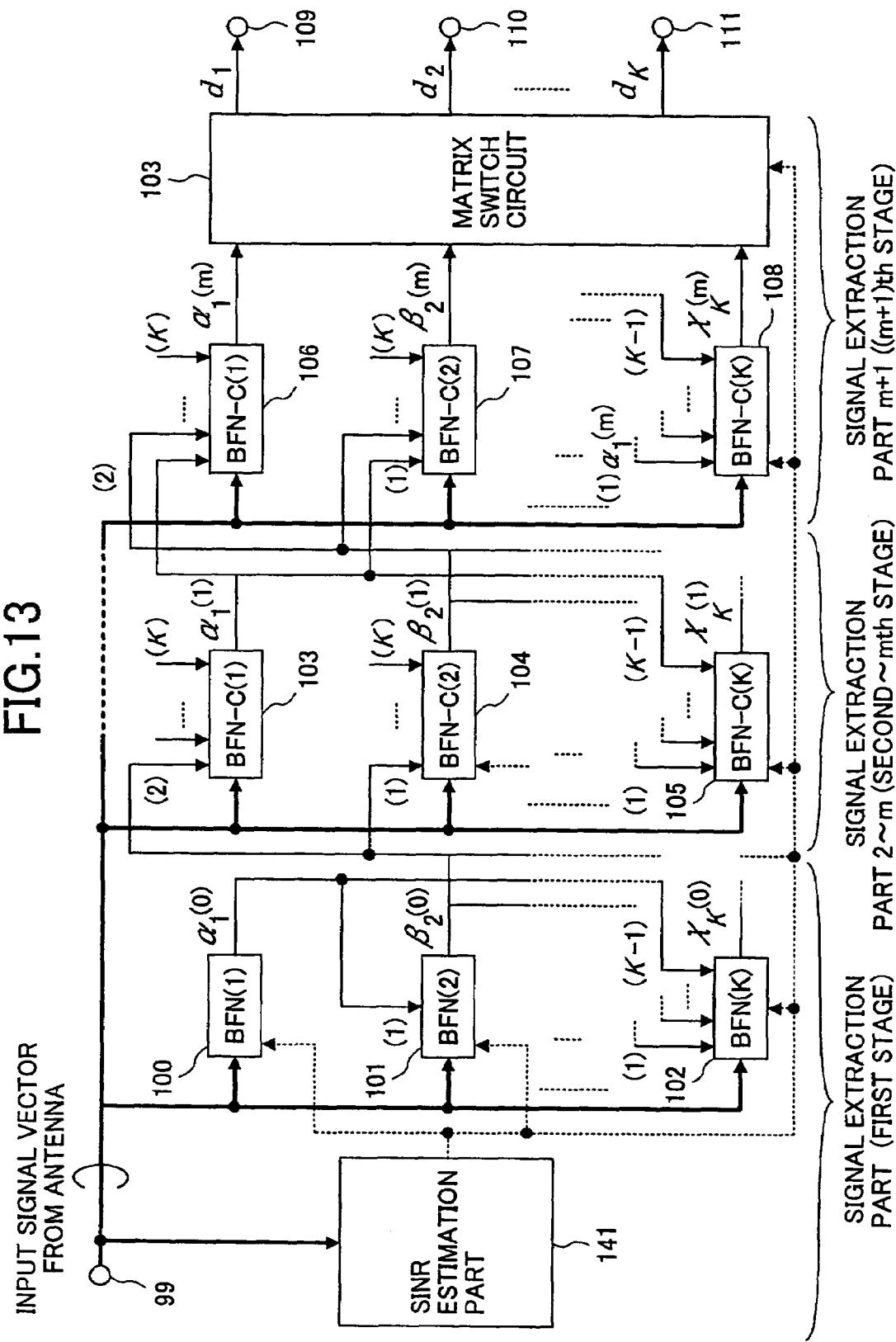
FIG. 13 shows a configuration of a signal extraction apparatus (third one) in the wireless communication system shown in FIG. 5.

In addition, the signal extraction apparatus 400 can be configured as shown in FIG. 13 which shows a third embodiment.

As shown in FIG. 13, the signal extraction apparatus 400 includes an input terminal 99 which receives signals from all elements of the array antenna, an SINR estimation part 141 which estimates SINR of each output signal, BFNs 100–108, a matrix switch circuit 142, and output terminals 109–111. The BFNs 100–102 correspond to a first stage signal extraction part 1, the BFNs 103–105 correspond to signal extraction parts after the second stage (from second to mth stage), the BFNs 106~108 corresponds to the final stage (m+1)th stage.

Figure 14:
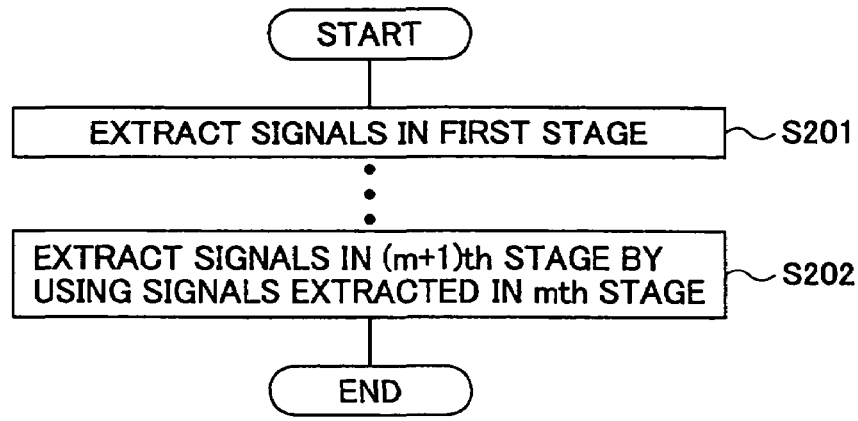
FIG. 14 is a flowchart showing an operation of the signal extraction apparatus.

In the following, the operation of the signal extraction apparatus 400 will be described with reference to FIG. 13 and a flowchart (FIG. 14).

The signal extraction apparatus 400 extracts signals $\beta_2^{(0)}$–$\chi_K^{(0)}$ by performing the same process as the signal extraction apparatus shown in FIG. 8 (step 201). The extracted signals $\beta_2^{(0)}$–$\chi_K^{(0)}$ are input into the BFN 103, that is, into the BFN-C(1) which is the first BFN in the second stage after the signals $\beta_2^{(0)}$–$\chi_K^{(0)}$ are adjusted as necessary.

In the second stage, signals $\alpha_1^{(1)}$–$\chi_K^{(1)}$ are extracted by using the signals obtained in the signal extraction part 1 of the first stage and the received signals received by a plurality of antennas. After the second stage, signals are extracted by performing the signal extraction process like in the second stage repeatedly by the predetermined signal extraction parts. Then, when the signal extraction process at the (m+1)th stage ends, the signal extraction part m+1 extracts signals $\alpha_1^{(m)} - \chi_K^{(m)}$ (step 202).

In this process, a kth BFN in the second signal extraction part or a later signal extraction part cancels, from the received signals, signal components extracted by BFNs in a previous stage signal extraction part other than a kth BFN in the previous stage signal extraction part so as to extract a kth signal.

The signals $\alpha_1^{(m)} - \chi_K^{(m)}$ are logically sorted in descending order of SINR on the basis of SINR estimation result in the SINR estimation part 141. The matrix switch circuit 142 performs switching such that the signals are output one by one in descending order of SINR. As a result, final signals $d_1 - d_K$ are output from the output terminals 109~111.

The basic structure of BFN-C(·)103~108 is the same as the BFN(K) 100~102 in FIG. 13.

As mentioned above, in the embodiment of the signal extraction apparatus shown in FIG. 13, since signal extraction is performed by using the received signals and signals extracted from the previous stage after the second stage, as the stage proceeds later, the more interference component included in each extracted signal is excluded. As a result, in the (m+1)th stage, the signals $d_1 - d_K$ which have good SINR can be extracted in a state where the interference condition is most relieved.

Figure 15:
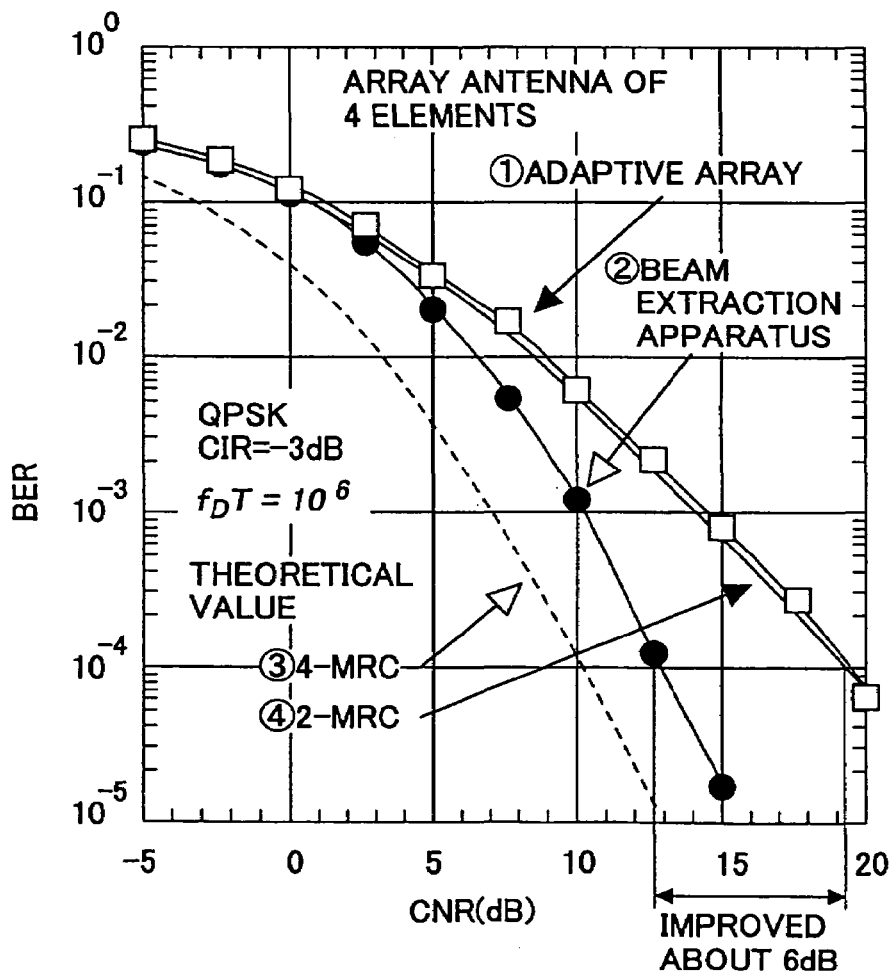
FIG. 15 shows a BER characteristic diagram when the signal extraction apparatus in the wireless communication system is used.

FIG. 15 shows a characteristic diagram (BER characteristic diagram) when the above-mentioned signal extraction apparatus 400 (first–third embodiments) is applied to a mobile wireless system which uses QPSK (Quadrature Phase Shift Keying).

As for FIG. 15, an array antenna of four element type is used in which the element interval is more than 10λ such that diversity gain can be obtained. λ indicates wavelength of the wireless carrier. The signal extraction apparatus 400 shown in FIG. 5 includes three signals and adopts the FTF algorithm as the dimension extension high speed algorithm.

The transmission line is a Rayleigh fading channel, maximum Doppler frequency $f_D T$ which is normalized by the clock rate is $10^{-6}$. As for the interference condition, the interference waves are two waves and the levels of the desired wave and the interference wave are the same (CIR=−3 dB). The characteristic when the signal extraction apparatus 400 is used is indicated by ②. In FIG. 15, a characteristic ① of a four element adaptive array, and characteristics ③ and ④ of maximum ratio synthesizing diversity of four branches and two branches respectively are shown for comparison with ②. The characteristic of the four element adaptive array indicates a characteristic of maximum ratio synthesizing diversity of two elements since two degrees of freedom are reduced by two interference waves.

As is evident from this characteristic diagram, CNR(dB) which is required for obtaining BER=$10^{-4}$ is about 19 dB for the four element adaptive array. On the other hand, the CNR(dB) is about 13 dB for the signal extraction apparatus 400 of the present invention.

That is, when interference extraction is performed by generating a plurality of signals by using the signal extraction apparatus 400, about 6 dB gain (⑤) as shown in FIG. 15 is obtained so that the characteristic is improved.

According to the signal extraction apparatus 400, signals can be extracted accurately irrespective of the antenna element interval even when the number of interference waves is larger than the number of elements. Therefore, co-channel interference can be decreased on the basis of the extracted signals.

As a result, since the interference margin of the wireless communication system can be decreased, efficiency for using frequency can be improved and channel capacity can be increased. In addition, since weight coefficient estimation and update can be performed easily and speedily by the high speed dimension extension algorithm, the amount of computation can be decreased, terminals and base stations can be provided economically and terminals having long continuous operation hour can be provided.

According to the present invention, the beam forming part cancels signal component which has been extracted from received signals received by a plurality of antennas. Since signal extraction is performed one by one according to the number of the beam forming parts, signals of high SINR can be extracted irrespective of the antenna element interval.

In addition, since the adaptive controller of the beam forming part controls estimation and update of the weight coefficient adaptively so as to cancel signal component which has been extracted from the received signals, the beam forming part can perform signal extraction with reliability.

In addition, since the high speed dimension extension algorithm is used for the weight coefficient estimation and update so that high speed operation is performed, signal extraction can be performed more speedily.

The present invention is not limited to the specifically disclosed embodiments, and variations and modifications may be made without departing from the scope of the invention.

What is claimed is:

1. A signal extraction method in which signals are extracted by using K beam forming parts, wherein K is a natural number equal to or more than 2, and received signals from a plurality of antennas are applied to each beam forming part, said signal extraction method comprising the steps of:

processing said received signals by each beam forming part successively;

extracting a first signal from said received signals by a first beam forming part; and receiving by a kth beam forming part signal components which are extracted by beam forming parts from said first beam forming part to a (k−1)th beam forming part, weighting said received signals and said signal components by using weight coefficients determined by an adaptive controller in said kth beam forming part, and adding the weighted received signals and the weighted signal components so as to cancel said signal components from said received signals to extract a kth signal, wherein $2 \leq k \leq K$.

2. A signal extraction method in which signals are extracted by using signal extraction parts, wherein received signals from a plurality of antennas are applied to each signal extraction part, said signal extraction parts being connected, each signal extraction part including K beam forming parts, wherein K is a natural number equal to or more than 2, said signal extraction method comprising the steps of:

processing said received signals by each beam forming part successively in a first signal extraction part;

extracting a first signal from said received signals by a first beam forming part in said first signal extraction part;

canceling with a kth beam forming part in said first signal extraction part, from said received signals, signal components which are extracted by beam forming parts from said first beam forming part to a (k−1)th beam forming part so as to extract a kth signal, wherein $2 \leq k \leq K$; and canceling with a kth beam forming part in a second signal extraction part or a later signal extraction part, from said received signals, signal components extracted by beam forming parts in a previous stage signal extraction part other than a kth beam forming part in said previous stage signal extraction part so as to extract a kth signal.

3. The signal extraction method as claimed in claim 1; further comprising the steps of:

estimating an SINR value of a signal on the basis of said received signals; and changing order in which said beam forming parts perform signal extraction.

4. The signal extraction method as claimed in claim 2, further comprising the steps of:

estimating an SINR value of a signal on the basis of said received signals; and changing order in which said beam forming parts perform signal extraction.

5. A signal extraction apparatus which extracts signals from received signals from a plurality of antennas, said signal extraction apparatus comprising:

K beam forming parts, wherein K is a natural number equal to or more than 2, and said received signals are applied to each beam forming part;

said received signals being processed by each beam forming part successively;

a first beam forming part extracting a first signal from said received signals; and a kth beam forming part receiving signal components which are extracted by beam forming parts from said first beam forming part to a (k−1)th beam forming part weighting said received signals and said signal components by using weight coefficients determined by an adaptive controller in said kth beam forming part, and adding the weighted received signals and the weighted signal components so as to cancel said signal components from said received signals to extract a kth signal, wherein $2 \leq k \leq K$.

6. A signal extraction apparatus which extracts signals from received signals from a plurality of antennas, said signal extraction apparatus comprising:

signal extraction parts which are connected, each signal extraction part receiving said received signals;

each signal extraction part including K beam forming parts, wherein K is a natural number equal to or more than 2;

each beam forming part processing said received signals successively in a first signal extraction part;

a first beam forming part in said first signal extraction part extracting a first signal from said received signals;

a kth beam forming part in said first signal extraction part canceling, from said received signals, signal components which are extracted by beam forming parts from said first beam forming part to a (k−1)th beam forming part so as to extract a kth signal, wherein $2 \leq k \leq K$; and a kth beam forming part in a second signal extraction part or a later signal extraction part canceling, from said received signals, signal components extracted by beam forming parts in a previous stage signal extraction part other than a kth beam forming part in said previous stage signal extraction part so as to extract a kth signal.

7. The signal extraction apparatus as claimed in claim 5, further comprising:

an SINR estimation part which estimates an SINR value of a signal on the basis of said received signals; and wherein order in which said beam forming parts perform signal extraction is changed on the basis of said SINR value.

8. The signal extraction apparatus as claimed in claim 6, further comprising:

an SINR estimation part which estimates an SINR value of a signal on the basis of said received signals; and wherein order in which said beam forming parts perform signal extraction is changed on the basis of said SINR value.

9. The signal estimation apparatus as claimed in claim 7, comprising:

K SINR estimation parts;

each SINR estimation part comprising beam forming parts, subtracters, square circuits and a minimum state estimation part;

a kth beam forming part in said beam forming parts receiving said received signals and signals extracted by beam forming parts up to (k−1) th beam forming part in which $0 \leq k-1 \leq K-1$, and outputting an extraction signal other than signals extracted by beam forming parts up to (k−1)th beam forming part;

said subtracter performing subtraction between a known signal and an said extraction signal so as to obtain a value, said known signal corresponding to a predetermined signal component other than signals extracted by beam forming parts up to said (k−1)th beam forming part;

said value being input into said square circuit so that an error is calculated;

said minimum state estimation part detecting a minimum value according to said error so that an SINR estimation result is output.

10. The signal extraction apparatus as claimed in claim 5, said beam forming part comprising an adder, an error detection part, first multipliers to which said received signals are applied, second multipliers to which signals extracted by beam forming parts up to (k−1)th beam forming part are applied, and an adaptive controller;

said adaptive controller receiving signals extracted by beam forming parts up to (k−1)th beam forming part and an error signal detected by said error detection part;

said adaptive controller estimating weight coefficients of said first and second multipliers so as to cancel, from said received signals, signal components extracted by beam forming parts up to (k−1)th beam forming part and extract only a predetermined signal; and wherein said weight coefficients are assigned to said received signals and signals extracted by beam forming parts up to (k−1)th beam forming part in said first and second multipliers, said signals to which said weight coefficients are assigned are applied to said adder, and an output signal of said adder is applied to said error detection part.

11. The signal extraction apparatus as claimed in claim 6, said beam forming part comprising an adder, an error detection part, first multipliers to which said received signals are applied, second multipliers to which signals extracted by beam forming parts up to (k−1)th beam forming part are applied, and an adaptive controller;

said adaptive controller receiving signals extracted by beam forming parts up to (k−1)th beam forming part and an error signal detected by said error detection part;

said adaptive controller estimating weight coefficients of said first and second multipliers so as to cancel, from said received signals, signal components extracted by beam forming parts up to (k−1)th beam forming part and extract only a predetermined signal; and wherein said weight coefficients are assigned to said received signals and signals extracted by beam forming parts up to (k−1)th beam forming part in said first and second multipliers, said signals to which said weight coefficients are assigned are applied to said adder, and an output signal of said adder is applied to said error detection part.

12. The signal estimation apparatus as claimed in claim 5, said beam forming part comprising feedforward filters and feedback filters with tap delay line, an adaptive controller and an adder;

each feedforward filter receiving a received signal from an antenna corresponding to said each feedforward filter, performing weighting and adding operation by using tap coefficient estimated by said adaptive controller adaptively, and said adder receiving outputs from said feedforward filters so as to extract a predetermined signal;

said predetermined signal being applied to said feedback filters; and each feedback filter performing weighting and adding operation by using tap coefficients estimated by said adaptive controller adaptively, and said adder receiving outputs from said feedback filters.

13. The signal estimation apparatus as claimed in claim 6, said beam forming part comprising feedforward filters and feedback filters with tap delay line, an adaptive controller and an adder;

each feedforward filter receiving a received signal from an antenna corresponding to said each feedforward filter, performing weighting and adding operation by using tap coefficient estimated by said adaptive controller adaptively, and said adder receiving outputs from said feedforward filters so as to extract a predetermined signal;

said predetermined signal being applied to said feedback filters; and each feedback filter performing weighting and adding operation by using tap coefficients estimated by said adaptive controller adaptively, and said adder receiving outputs from said feedback filters.

14. The signal extraction apparatus as claimed in claim 12, said adaptive controller estimating said weight coefficients adaptively so as to canceling, from said received signals, signal components extracted by beam forming parts up to (k−1)th beam forming part; wherein a dimension extension type algorithm is used for estimation of said weight coefficients, one kind of gain vector is generated, and said gain vector is used for said estimation and update of said weight coefficients.

15. The signal extraction apparatus as claimed in claim 13, said adaptive controller estimating said weight coefficients adaptively so as to canceling, from said received signals, signal components extracted by beam forming parts up to (k−1)th beam forming part; wherein a dimension extension type algorithm is used for estimation of said weight coefficients, one kind of gain vector is generated, and said gain vector is used for said estimation and update of said weight coefficients.

16. A signal extraction method in which signals are extracted by using K beam forming parts, wherein K is a natural number equal to or more than 2, and received signals from a plurality of antennas are applied to each beam forming part, said signal extraction method comprising the steps of:

processing said received signals by each beam forming part successively;

extracting a first signal from said received signals with a first beam forming part;

canceling with a kth beam forming part, from said received signals, signal components which are extracted by beam forming parts from said first beam forming part to a (k−1)th beam forming part so as to extract a kth signal, wherein $2 \leq k \leq K$;

estimating an SINR value of a signal on the basis of said received signals; and changing order in which said beam forming parts perform signal extraction.

17. A signal extraction apparatus which extracts signals from received signals from a plurality of antennas, said signal extraction apparatus comprising:

K beam forming parts, wherein K is a natural number equal to or more than 2, and said received signals are applied to each beam forming part, said received signals being processed by each beam forming part successively;

a first beam forming part extracting a first signal from said received signals;

a kth beam forming part canceling, from said received signals, signal components which are extracted by beam forming parts from said first beam forming part to a (k−1)th beam forming part so as to extract a kth signal, wherein $2 \leq k \leq K$; and an SINR estimation part which estimates an SINR value of a signal on the basis of said received signals, wherein an order in which said beam forming parts perform signal extraction is changed on the basis of said SINR value.

18. A signal extraction apparatus which extracts signals from received signals from a plurality of antennas, said signal extraction apparatus comprising:

K beam forming parts, wherein K is a natural number equal to or more than 2, and said received signals are applied to each beam forming part, said received signals being processed by each beam forming part successively;

a first beam forming part extracting a first signal from said received signals; and a kth beam forming part canceling, from said received signals, signal components which are extracted by beam forming parts from said first beam forming part to a (k−1)th beam forming part so as to extract a kth signal, wherein $2 \leq k \leq K$, wherein said beam forming part includes an adder, an error detection part, first multipliers to which said received signals are applied, second multipliers to which signals extracted by beam forming parts up to (k−1)th beam forming part are applied, and an adaptive controller;

said adaptive controller is configured to receive signals extracted by beam forming parts up to (k−1)th beam forming part and an error signal detected by said error detection part;

said adaptive controller is configured to estimate weight coefficients of said first and second multipliers so as to cancel, from said received signals, signal components extracted by beam forming parts up to (k−1)th beam forming part and extract only a predetermined signal; and said weight coefficients are assigned to said received signals and signals extracted by beam forming parts up to (k−1)th beam forming part in said first and second multipliers, said signals to which said weight coefficients are assigned are applied to said adder, and an output signal of said adder is applied to said error detection part.

19. A signal extraction apparatus which extracts signals from received signals from a plurality of antennas, said signal extraction apparatus comprising:

K beam forming parts, wherein K is a natural number equal to or more than 2, and said received signals are applied to each beam forming part, said received signals being processed by each beam forming part successively; and a first beam forming part extracting a first signal from said received signals; and a kth beam forming part canceling, from said received signals, signal components which are extracted by beam forming parts from said first beam forming part to a (k−1)th beam forming part so as to extract a kth signal, wherein $2 \leq k \leq K$, wherein said beam forming part includes feedforward filters and feedback filters with tap delay line, an adaptive controller and an adder;

each feedforward filter is configured to receive a received signal from an antenna corresponding to said each feedforward filter, performing weighting and adding operation by using tap coefficient estimated by said adaptive controller adaptively, and said adder receiving outputs from said feedforward filters so as to extract a predetermined signal;

said predetermined signal being applied to said feedback filters; and each feedback filter is configured to perform a weighting and adding operation by using tap coefficients estimated by said adaptive controller adaptively, and said adder receiving outputs from said feedback filters.

* * * * *